(No Model.) 2 Sheets—Sheet 1.

A. C. CHRISTENSEN.
WATER AND STEAM METER.

No. 269,260. Patented Dec. 19, 1882.

Witnesses
H. Raßbach
Otto Risch

Inventor
August C. Christensen
By Paul Goepel
Attorney (No Model.) 2 Sheets—Sheet 2.

A. C. CHRISTENSEN.
WATER AND STEAM METER.

No. 269,260. Patented Dec. 19, 1882.

WITNESSES:
H. Rassbach
Otto Risch

INVENTOR
August C. Christensen
BY Paul Goepel
ATTORNEY

UNITED STATES PATENT OFFICE.

AUGUST C. CHRISTENSEN, OF BROOKLYN, NEW YORK.

WATER AND STEAM METER.

SPECIFICATION forming part of Letters Patent No. 269,260, dated December 19, 1882.

Application filed July 20, 1882. (No model.)

*To all whom it may concern:*

Be it known that I, AUGUST C. CHRISTENSEN, of Brooklyn, in the county of Kings and State of New York, have invented certain new and useful Improvements in Water and Steam Meters, of which the following is a specification.

This invention relates to that class of meters known as "piston" meters, and may be used for measuring water and steam.

The invention consists of a meter the reciprocating plungers or pistons of which are each made in the form of slide-valves, which work in connection with inlet and outlet ports and diagonal passages arranged in the lower part of the casing of the meter, the inlet of the water being regulated by gridiron-valves sliding on the top part of each plunger, the whole being so arranged as to enable each plunger or piston to entirely finish its stroke, whereby the absolutely correct measurement of the fluid or steam is obtained.

Figure 2:
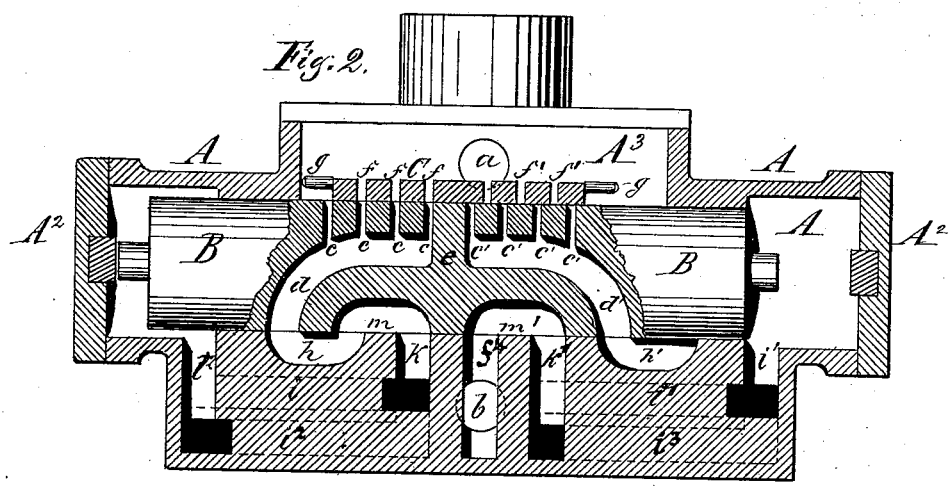
Figure 1:
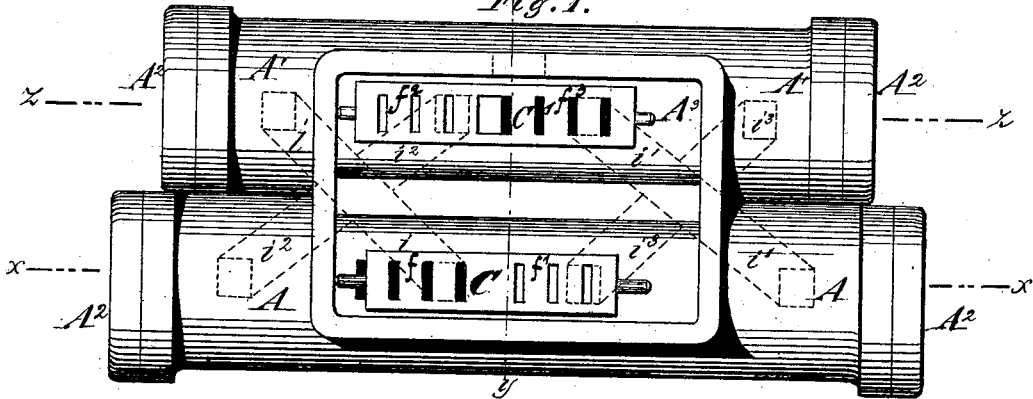
Figure 3:
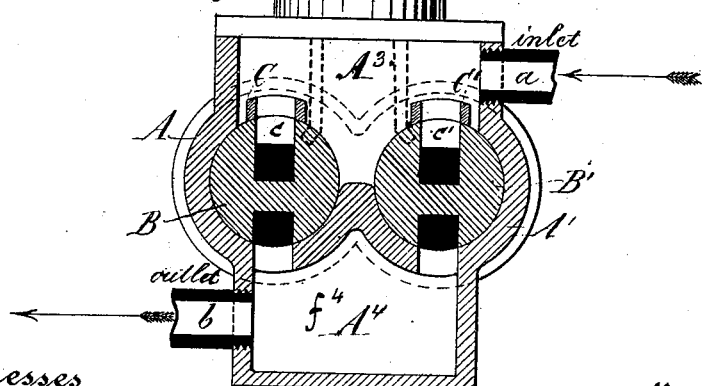
Figure 4:
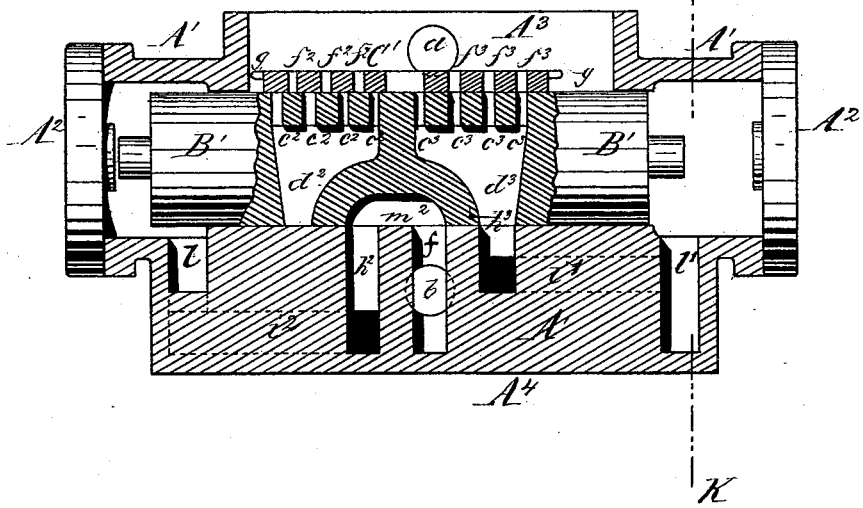
Figure 5:
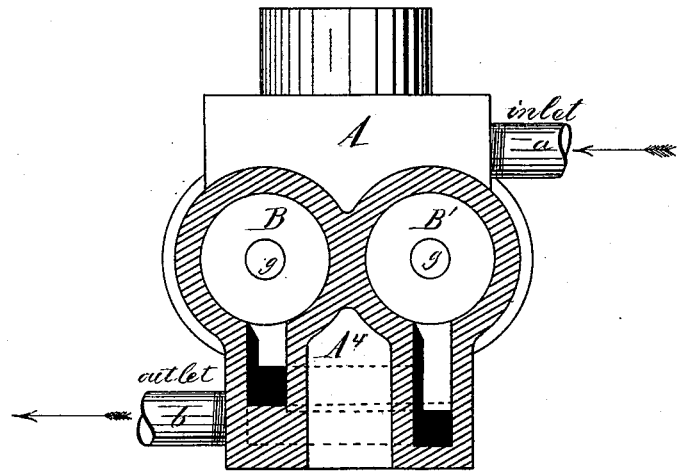

In the accompanying drawings, Figure 1 represents a plan view of my improved water and steam meter, in which the top plate and counter are removed, so as to show the admission-valves. Figs. 2 and 3 are respectively a vertical longitudinal section on line $x\,x$, Fig. 1, and a vertical transverse section on line $y\,y$, Fig. 1; and Figs. 4 and 5 are respectively a vertical longitudinal section on line $z\,z$, Fig. 1, and a vertical transverse section on line K K, Fig. 4.

Similar letters of reference indicate corresponding parts.

The body or casing of this improved water and steam meter is preferably cast in one piece, and consists of two parallel hollow cylinders, A A', closed by heads $A^2$, secured thereto, an upper chamber or valve-chest, $A^3$, extending from the top side of one cylinder to the top side of the other cylinder, and provided with an inlet-port, $a$, and a lower oblong chamber, $A^4$, extending from the bottom side of one cylinder to the bottom side of the adjacent cylinder, and provided with an outlet-port, $b$.

The plungers B B', which partake of the character of slide-valves, are cylindrical in shape, and fit closely the interior of the respective cylinders. The plunger B is provided in its upper side with a series of narrow inlet-openings, $c\,c'$, the openings $c$ communicating with a channel, $d$, at one side of the central partition, $e$, while the openings $c'$ communicate with a similar channel, $d'$, on the other side of said partition. The plunger B' is also provided with a series of similar inlet-openings, $c^2\,c^3$, which communicate respectively with the channels $d^2\,d^3$.

Resting upon the respective plungers are two sliding gridiron slide-valves, C C', which are concaved on their under sides to fit the rounded surfaces of the plungers. The valve C is provided with openings $f$, which register with the openings $c$, and with openings $f'$, which register with the openings $c'$, the two sets of openings being so arranged that when those of one side are open those of the other side are closed. The valve C' is provided with similar openings, $f^2\,f^3$, which register with the openings $c^2\,c^3$. Each of these gridiron-valves is also provided with studs $g\,g$ at either end, which come in contact with the ends of the valve-chest as the plunger nears the end of its stroke and cause the valve to shift, so as to close one set of openings and open the other set.

The channels $d\,d'$ of the plunger B communicate respectively with the channels $h\,h'$ of the cylinder A as said plunger moves alternately from one end of said cylinder to the other, while the channels $d^2\,d^3$ of the cylinder B' communicate respectively with the channels $h^2\,h^3$ of the cylinder A'. A diagonal channel, $i$, connects the channel $h$ of the cylinder A with the left-hand end of cylinder B' by means of the vertical channels $k$ and $l$ and the curved channel $m$ of the plunger B. The diagonal channel $i'$, parallel with channel $i$, connects the channel $h^3$ of cylinder A' with the right-hand end of cylinder A. Correspondingly the diagonal channel $i^2$ connects the channel $h^2$ of cylinder A' with the left-hand end of cylinder A, while the parallel diagonal channel $i^3$ connects the channel $h'$ of cylinder A with the right-hand end of cylinder A' by means of the vertical channels $k'\,l'$ and the curved channel $m'$ of plunger B.

The operation of my improved water-meter is as follows: The water enters through the inlet-port $a$ into the valve-chest $A^3$, and passes then through the opening $f^3$ of the gridiron slide-valve C' and the ports $c^3$, channels $d^3$ and $h^3$, and the diagonal channel $i'$ to the right-hand end of cylinder A, exerting thereby a pressure at the right-hand end of piston B and forcing the same toward the left into the position shown in the drawings. The plunger B carries along its gridiron slide-valve C, the stud $g$ of which strikes against the side wall of the chest $A^3$, so as to open the port $f$ and admit a current of water to pass through the openings $f c$ and the channels $d\ h\ m\ k$ and the diagonal channel $i$ to the channel $l$ to the left-hand end of the cylinder A'. At this point both pistons are at one and the same end of the cylinders A A'. Owing to the pressure of the water on the left-hand end of the piston B', it is forced toward the right until the stud of its slide-valve C' strikes the opposite side of the chest $A^3$, whereby the gridiron slide-valve C' is shifted and a current of water allowed to pass through the ports $f^2\ c^2$ and the channels $d^2\ h^2$ and the diagonal channel $i^2$ to the left-hand end of the cylinder A, so as to compel the piston B to quickly follow the piston B' and to move it over to the right-hand end of the cylinder A. The stud $g$ of the slide-valve C thereby strikes against the right-hand side wall of the chest $A^3$, causes the slide-valve C to be shifted and a current of water to pass through the ports $f'$ $c'$ and the channels $d'\ h'\ m'\ k'$ and the diagonal channel $i^3$ to the right-hand end of cylinder A', so as to throw thereby the piston B' toward the left. Corresponding to the movements of the pistons described, the spaces filled with water between the ends of the pistons and the cylinder-heads are successively exhausted, the right-hand end of the cylinder A' exhausting through the diagonal channel $i^3$, channel K', $m'$, and $f^4$ to the exhaust-port. The right-hand end of the cylinder A exhausts next through the diagonal channel $i'$, $h^3$, $m^2$, and $f$ to the exhaust-port. The left-hand end of the cylinder A' exhausts next through the channel $l$, diagonal channel $i$, channels $k$, $m$, and $f^4$ to the exhaust-port $b$. Finally the water in the space at the left-hand end of the cylinder A is exhausted through channel $l^2$, diagonal channel $i^2$, channel $h^2$, $m^2$, and $f$ to the exhaust-port $b$. In the operations described two sets of channels serve to conduct the water to the same ends of the respective cylinders, while the other two sets serve to exhaust it from the opposite ends of the respective cylinders.

The plunger-valve of cylinder A is preferably a B-valve, while the plunger-valve of cylinder A' is preferably a D-valve.

The cover $A^5$ of the box $A^3$ is provided with inwardly-projecting studs $s\ s$, (shown in dotted lines in Fig. 3,) the lower ends of which project into longitudinal grooves in the plungers and serve to prevent rotation of the latter. The gridiron-valves are kept in position by the side walls of the box and by the studs. The studs may serve simply for preventing lateral movement of the gridiron-valves, and any other suitable means adopted for preventing rotation of the plungers.

The motion of the plungers is registered, in the manner well known in water-meters, by a suitable connecting mechanism on a counter, D, placed on the top plate of the chest $b$, said registering mechanism being not shown in the drawings, as the same is a well-known feature of all water-meters with reciprocating plungers.

The advantages of arranging the plungers with slide-valves in the body thereof is that the expense for separate valves and valve-seats in the lower part is dispensed with, and that the whole body can be cast in one piece, instead of the lower, $A^4$, being screwed to the bottom of the cylindrical casing, as has been the case heretofore in water-meters with reciprocating plungers. Another advantage is that by the actions of the plungers the admission and exhaust are directly regulated, instead of one plunger working the valve of the other plunger, as heretofore. Owing to the fact that each plunger is enabled to entirely finish its stroke before the other begins its motion, the meter will register water or steam at any speed with absolute safety, and form thereby a reliable, durable, and comparatively inexpensive measuring device that is adapted for water or steam, as the case may be.

Having thus described my invention, I claim as new and desire to secure by Letters Patent—

1. The combination of an inclosing-casing having a chest at the upper part and diagonal channels at the lower part, reciprocatory plungers or pistons having channels forming slide-valves, and valves resting loosely on said plungers and operated by contact with the casing, substantially as described.

2. In a water and steam meter, the combination of an inclosing-casing having a chest at the upper part and two sets of diagonal channels crossing each other at the lower part, two reciprocatory plungers or pistons having channels which form slide-valves, two double gridiron slide-valves having curved under faces resting on said plungers and communicating with openings therein, one half the openings to each gridiron-valve being closed while the other half is open, substantially as described.

In testimony that I claim the foregoing as my invention I have signed my name in presence of two subscribing witnesses.

AUGUST C. CHRISTENSEN.

Witnesses:
PAUL GOEPEL,
SIDNEY MANN.